Aug. 25, 1959  P. R. SETHNA  2,901,239
SUSPENSION SYSTEM
Filed Sept. 10, 1956  3 Sheets-Sheet 1

INVENTOR.
PATARASP R. SETHNA
BY
ATTORNEY

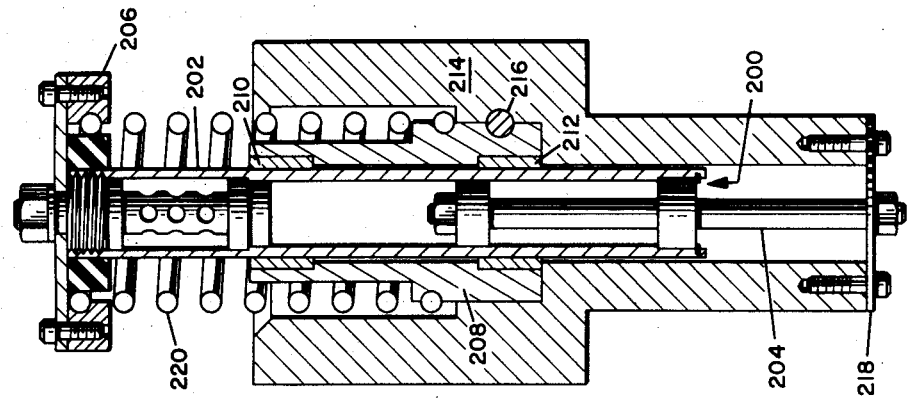
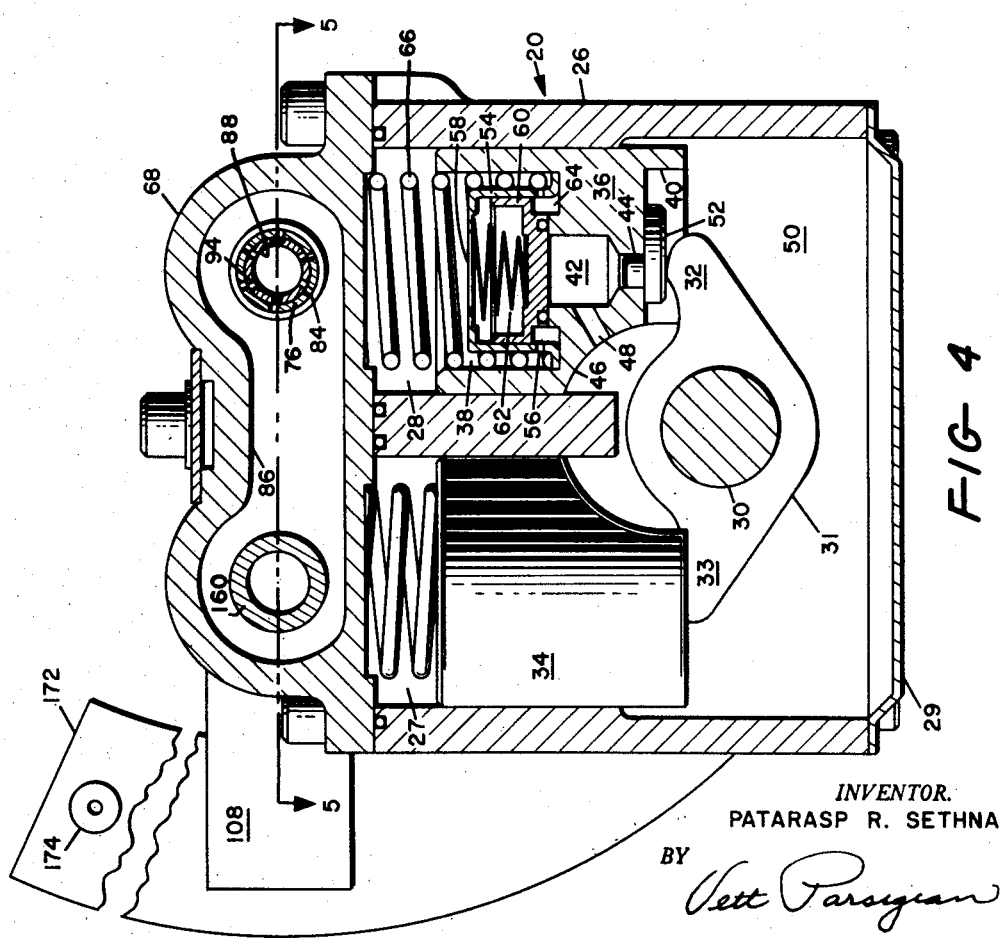

Aug. 25, 1959  P. R. SETHNA  2,901,239
SUSPENSION SYSTEM
Filed Sept. 10, 1956  3 Sheets-Sheet 3
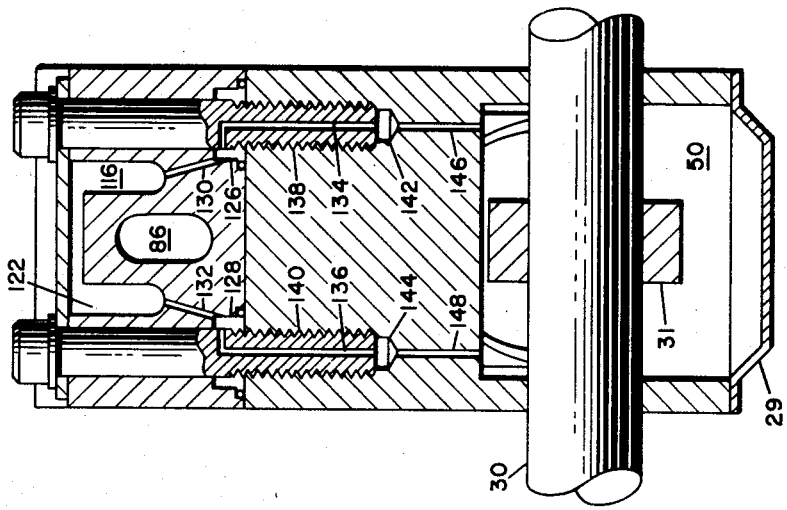
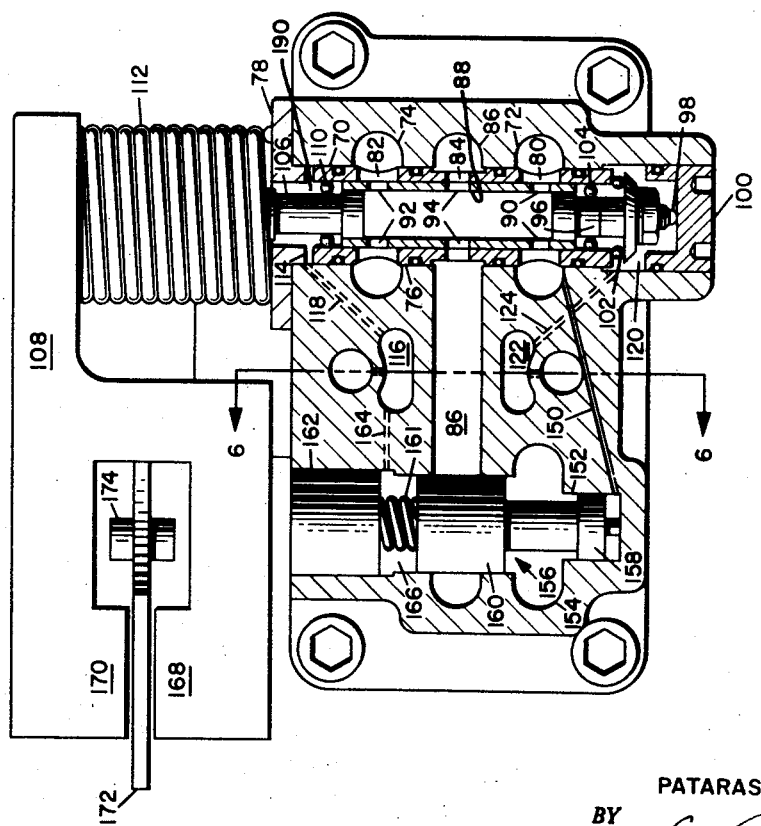
INVENTOR.
PATARASP R. SETHNA
BY
ATTORNEY

United States Patent Office 2,901,239
Patented Aug. 25, 1959

2,901,239

SUSPENSION SYSTEM

Patarasp R. Sethna, Detroit, Mich., assignor to Bendix Aviation Corporation, Detroit, Mich., a corporation of Delaware Application September 10, 1956, Serial No. 608,992

8 Claims. (Cl. 267—8)

This invention relates to suspension systems and relates more particularly to suspension systems for apparatus having relatively movable masses.

Although the invention will be described in its application to automotive vehicles, it is to be understood that its principles may be readily applied to other apparatus. In the description, the vehicle will be considered as having two masses referred to as the sprung and unsprung masses. The sprung mass includes the frame and its associated structure and the unsprung mass includes the wheel assembly and its associated structure.

In present vehicles the suspension system includes a spring and a shock absorber connected between the sprung and unsprung masses. Whenever there is relative movement between the sprung and unsprung masses, the shock absorber acts to damp this movement. The damping action occurs in the same degree regardless of whether the relative movement is caused by motion of the sprung mass or by motion of the unsprung mass. Each time there is relative movement, the damping action of the shock absorber causes a reactive force to be transmitted to the sprung mass. It is this reactive force which causes discomfort to persons in a vehicle.

Because of the heavy weight of the sprung mass, its resonant frequency is relatively low, such as one cycle per second. Therefore, any excitation of the sprung mass causes it to move at or near the resonant frequency. The resultant reactive forces produced at such relatively low frequencies do not appreciably affect the comfort of persons in the vehicle. On the other hand, because of the light weight of the unsprung mass, its resonant frequency is relatively high, such as 10 cycles per second and movements of the unsprung mass occur at or near this frequency. The resultant reactive forces produced at such high frequencies cause considerable discomfort. It is, therefore, obvious that the comfort in a vehicle would be greatly enhanced if the high frequency movements of the unsprung mass could be damped so that little or no reactive forces are transmitted to the sprung mass of the vehicle during movements of the unsprung mass.

This invention provides a suspension system which damps movements of the unsprung mass without the transmission of any appreciable reactive forces to the sprung mass. The system includes a controlled shock absorber connected between the sprung and unsprung masses and a dynamic balancer mounted on the unsprung mass.

During excitation of mainly the unsprung mass, the dynamic balancer damps the unsprung mass while the damping action of the shock absorber is minimized to prevent the transmission of appreciable reactive forces to the sprung mass. During excitation of mainly the sprung mass, the damping action of the shock absorber is maximized so as to effectively damp the sprung mass. Finally, during excitation of both the sprung and unsprung masses, such as occurs on bad roads, the damping action of the shock absorber is maximized to effectively damp the sprung mass and to damp the unsprung mass in cooperation with the damping provided by the dynamic balancer. This increased damping of the unsprung mass maintains the wheels in better contact with the road and gives the driver added control over the vehicle when such control is most needed.

An object of this invention is to provide an improved suspension system for apparatus, such as automotive vehicles, having a pair of relatively movable masses; namely, a sprung mass and an unsprung mass.

Another object of this invention is to provide a suspension system of the above character which effectively damps movements of the sprung and unsprung masses without the transmission of appreciable reactive forces to the sprung mass.

Still another object of this invention is to provide a suspension system of the above character which effectively damps movements of the unsprung mass to give increased driver control over bad roads.

A further object of this invention is to provide a suspension system of the above character which includes a controlled shock absorber supported between the sprung and unsprung masses and a dynamic balancer supported on the unsprung mass.

Other objects and advantages will become apparent from the following detailed description and from the appended drawings and claims.

In the drawings:

Figure 4 is a sectional view taken substantially at line 4—4 of the shock absorber in Figure 1.

Figure 5 is a sectional view taken substantially at line 5—5 in Figure 4.

Figure 6 is a sectional view taken substantially at line 6—6 in Figure 5.

Figure 7 is a sectional view taken substantially at line 7—7 of the dynamic balancer in Figure 1.

Figure 1:
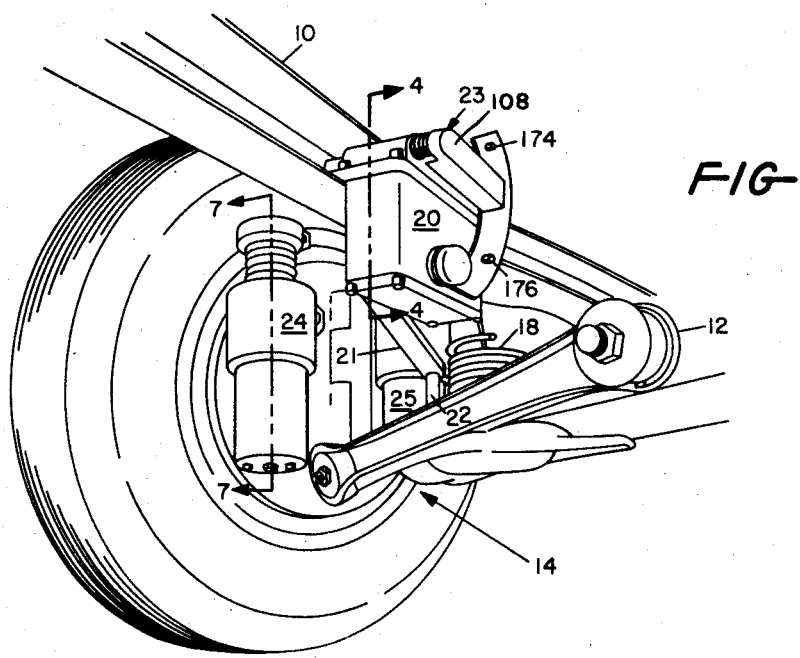
Figure 1 is a perspective view of the inside of the front left wheel of an automotive vehicle as seen from the front of the vehicle showing the suspension system constituting one embodiment of this invention.
Figure 2:
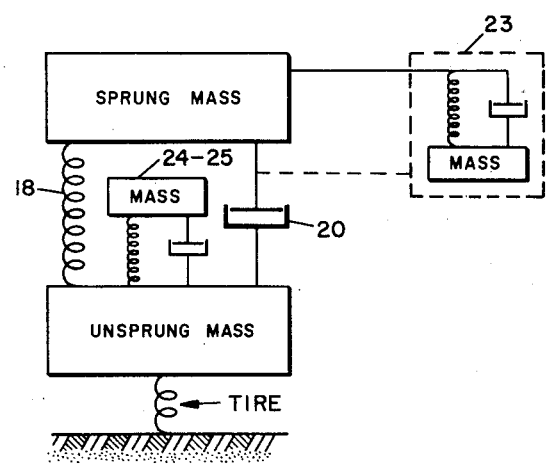
Figure 2 is a schematic diagram of the suspension system shown in Figure 1.

In Figure 1 an automobile frame 10, which together with its associated structure will be hereinafter referred to as the sprung mass of the automobile, is connected to an A-frame 12 which in turn is connected to a wheel assembly generally indicated at 14. The wheel assembly 14 together with its associated structure including the A-frame 12 will be hereinafter referred to as the unsprung mass of the vehicle. The unsprung mass is connected to the sprung mass in a conventional manner by a resilient member, such as a coil spring 18. A shock absorber 20 is connected to the frame 10 and to the A-frame through an arm 21 and a rod 22 which is pivotally attached to the arm. The shock 20 supports a sensor 23 which will hereinafter be described in detail. A pair of dynamic balancers 24 and 25 are supported on the wheel assembly 14. Although it would be possible to use one dynamic balancer, two are used in the embodiment shown to equally distribute weight on the wheel assembly. Figure 2 is a schematic of the suspension system described above.

The shock absorber 20 which is filled with a hydraulic fluid, such as oil, is shown in detail in Figures 4, 5 and 6. A housing 26 defines a pair of cylindrical piston chambers 27 and 28. The bottom of the housing 26 is covered with a plate 29. Journalled on opposite sides of the housing 26 is a shaft 30 which snugly retains a cam 31 having a pair of arms 32 and 33. The shaft 30 is connected to the arm 21 (Figure 1) which upon relative movement between the A-frame 12 and the frame 10 causes a rotational movement of the shaft 30 and a corresponding movement of the cam 31. For example, when the sprung and unsprung masses move apart relative to each other, the arm 21 moves downward and as a result the shaft 30 and the cam 31 rotate in a counterclockwise direction in Figure 4. When the sprung and unsprung masses move towards each other, the arm 21 moves upward and as a result the shaft 30 and the cam 31 rotate in a clockwise direction.

Positioned respectively in the chambers 27 and 28 are a pair of pistons 34 and 36. The piston 36 is provided with an annular bore 38 at its upper end and a slot 40 at its lower end. The piston 36 is also provided with an annular chamber 42 which extends at a reduced diameter 44 into the slot 40. A portion of the piston is cut away as at 46 so as to provide space in the housing 26 for movement of the cam 31. A hole 48 connects the chamber 42 to the chamber 50 defined in the bottom of the housing 26.

Fitted into the reduced diameter 44 is a plug 52 which is contacted by the arm 32 of the cam 31. A cylindrical housing 54 rests on the piston 36 at the base of the bore 38. The housing 54 is provided with a plurality of orifices 56 around its base and is also provided with an opening 58 at its top. Slidably retained within the housing 54 is a member 60 which is connected to the housing with a coil spring 62. The spring 62 maintains the member 60 against the bottom of the bore 38 thus blocking the chamber 42 and preventing its communication with the chamber 64 which is defined between the housing 54 and the member 60. The plug 52 is maintained in contact with the arm 32 of the cam 31 because of the pressure exerted on the piston 36 by a coil spring 66 disposed between the base of the housing 54 and the upper housing 68 of the shock absorber. The piston 34 and the other parts provided in the chamber 27 are identical to the piston 36 and the other parts in the chamber 28 as described above.

The housing 68 is provided with an annular bore 70 (Figure 5) and a pair of annular grooves 72 and 74 in the bore which communicate with the piston chamber 28. Inserted snugly in the bore 70 is a bearing sleeve 76 having a plurality of openings 80 communicating with the groove 72 and a plurality of openings 82 communicating with the groove 74. The sleeve 76 is also provided with a plurality of orifices 84 which communicate with a groove 86 extending longitudinally in the housing 68. A flanged member 78 having its flanged portion resting against the housing 68 is inserted into one end of the bore 70.

A tube 88 is rotatably retained within the sleeve 76. A plurality of openings 90 in the tube 88 communicate fully at all times with the openings 80 in the sleeve and a plurality of openings 92 communicate fully at all times with the openings 82. Also provided in the tube 88 are a plurality of openings 94 which communicate fully with the orifices 84 in the sleeve 76 when the tube is in its normal position relative to the sleeve. One end of a shaft 96 is tightly fitted into the tube 88 and the opposite end of the shaft is provided with a ball 98 which rotates on the bearing surface of a bushing 100 which blocks an opening of the bore 70. Ball bearings 102 and 104 are suitably retained between the shaft 96 and the sleeve 76 to permit a free rotation of the tube 88 relative to the sleeve. One end of a shaft 106 is snugly fitted into the tube 88 and its other end is securely attached to a relatively heavy mass or block 108 which upon movement will cause a rotation of the shaft 106 and the tube 88. A ball bearing 110 is retained between the shaft 106 and the sleeve 76 and a coil spring 112 is connected between the block 108 and the flanged member 78.

An opening 114 between the sleeve 76 and the member 78 communicates with a groove 116 in the housing 68 through a line 118. Similarly, the chamber 120 defined between the bushing 100 and the shaft 96 communicates with a groove 122 in the housing 68 through a line 124. The grooves 116 and 122 communicate with grooves 126 and 128, respectively, in the housing 128 through lines 130 and 132. Lines 134 and 136 provided in bolts 138 and 140, respectively, connect grooves 126 and 128 to chambers 142 and 144 below the bolts. The chambers 142 and 144 connect with the chamber 50 through lines 146 and 148 provided in the housing 26.

A line 150 in the housing 68 connects the groove 72 to a bore 152 provided in the housing. Cut around the bore 152 is an annular groove 154 which communicates with the piston chamber 27. A spool generally indicated at 156 is slidably positioned in the bore 152 and is provided with lands 158 and 160. A spring 161 connected to the land 160 and to a bushing 162 in the bore 152 acts to maintain the spool 156 in a position so that the land 160 normally blocks any communication between the groove 154 and the groove 86. A line 164 connects the groove 116 to the chamber 166 defined between the land 160 and the bushing 162.

The block 108, previously disclosed, is provided with a pair of legs 168 and 170. The block 108 is made of a permanently magnetized material to produce flux lines in the air gap between the legs 168 and 170. A curvilinear plate 172, which is attached to the housing 26, extends through the air gap between the legs 168 and 170. Stops 174 and 176 provided on the plate 172 limit the movement of the block 108 relative to the plate.

Essentially, the dynamic dampers or balancers 24 and 25 include a direct acting telescopic type shock absorber, a mass connected to and movable with the plunger rod of each shock absorber and a coil spring connecting the mass to the outside housing of each shock absorber. Since the balancers 24 and 25 are identical, only the balancer 24 will be described in connection with Figure 7.

Generally indicated at 200 is a direct acting type shock absorber which includes, among other components, a housing 202 and a plunger rod 204. Since such shock absorbers are standard commercial items and their operation is well known to persons skilled in the art, no attempt will be made to describe the shock absorber 200 in detail.

The housing 202 is suitably secured at its upper end to a bracket 206 which is attached to the wheel of the vehicle (Figure 1). Slidably retained on the housing 202 is a weight 208 which is provided with a pair of annular bearings 210 and 212 in contact with the outside surface of the housing. Another weight 214 is held in fixed relationship to the weight 208 by a pin 216 so that both weights move as a unit. The weights 208 and 214 may be of any suitable shape so that the balancer 24 will fit properly when mounted on the wheel. Attached to the bottom of the weight 214 is a plate 218 to which the rod 204 is also suitably attached. A coil spring 220 is connected between the bracket 206 and the weight 208.

The operation of the suspension system disclosed above is hereinafter described.

During travel of a vehicle, various road conditions will cause relative motion between the sprung and unsprung masses of the vehicle. Under certain road conditions, for example, on washboard type roads, the relative motion between the sprung and unsprung masses will be caused predominantly by movements of the unsprung mass. As previously mentioned, the unsprung mass will oscillate at a relatively high frequency, such as 10 cycles per second, because of its relatively light mass. Under other road conditions, for example, at top or bottom of hills, the relative motion will be caused predominantly by movements of the sprung mass. Because of its relatively heavy mass, the sprung mass will oscillate at a relatively low frequency, such as 1 cycle per second. Of course, there are also road conditions which will cause at the same time oscillations of both the sprung and unsprung masses.

When the A-frame pivots downward, the arm 21 is moved downward by the rod 22 and as a result the shaft 30 and the cam 31 rotate in a counterclockwise direction in Figure 1. This causes the arm 32 to move piston 36 upward in the piston chamber 28. The resultant pressure increase in the chamber 28 is transmitted to the bore 152 through the groove 72 and the line 150 so as to exert this pressure against the land 158. When the pressure becomes high enough, such as 100 p.s.i., the force against the land 158 overcomes the force of the spring 161 and the spool 156 is displaced towards the bushing 162. The corresponding displacement of the land 160 results in a direct communication between the groove 86 and the groove 154.

Figure 3:
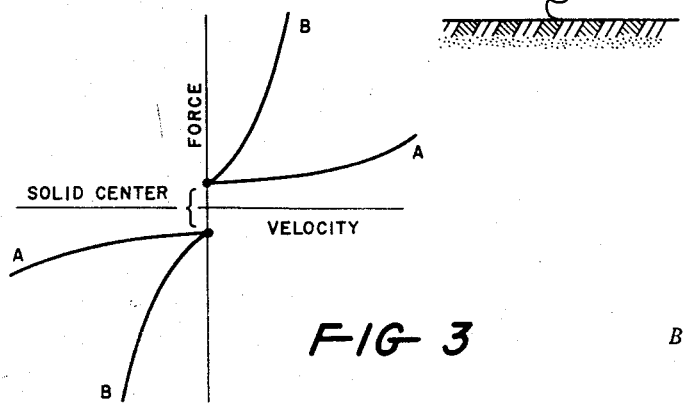
Figure 3 is a graph showing force versus velocity curves for the shock absorber shown in Figure 1.

The purpose of the valving action of the spool 156 is to maintain in the shock absorber 20 a force of particular value even at zero velocity so as to prevent small oscillations in the shock absorber. The "solid center" produced in the shock absorber by such valving action is shown in Figure 3.

When the groove 86 communicates with the groove 154, the displaced fluid in the piston chamber 28 flows to the piston chamber 27 through a first circuit including the groove 72, the openings 80 in the bearing 76, the openings 90 in the tube 88, the tube 88, the openings 94 in the tube 88, the orifices 84 in the bearing 76, the groove 86 and the groove 154 and through a second circuit including the groove 74, the openings 82, the openings 92, the tube 88, the openings 94, the orifices 84, the groove 86 and the groove 154. The fluid flow into the chamber 27 occupies the increased volume of the chamber caused by the downward displacement of the piston 34 against the cam arm 33 which moved downward because of the counterclockwise rotation of the cam 30.

The fluid flow is opposite to that described above when the A-frame pivots upwards towards the frame 10 to cause a clockwise rotation of the shaft 30 and the cam 31. The resultant upward movement of the piston 34 builds up a pressure in the chamber 27 and the groove 154. This pressure acts against the land 160 to displace the spool 156 so as to provide a direct communication between the grooves 154 and 86. The fluid is then free to flow to the piston chamber 28 in the opposite direction through the paths previously described.

As the piston 36 moves downward a corresponding amount, there is a possibility that air pockets will be produced in the chamber 28, especially when the piston moves at high velocity. To eliminate these air pockets, fluid is introduced to the chamber 28 from the chamber 50. Upon each downward movement of the piston 36, the member 60 becomes displaced from the bottom of the bore 38 at a relatively small back pressure, such as 2 p.s.i., to cause a direct communication between the chambers 42 and 64. The fluid may then flow to the chamber 28 from the chamber 50 to fill any air pockets through a circuit including the hole 48, the chamber 42, the chamber 64 and the orifices 56. When the piston 36 moves upward, the pressure exerted against the member 60 causes it to act as a check valve so as to block any communication between the chambers 42 and 64.

Any leakage of fluid into the chamber 120 is returned to the chamber 50 through the line 124, the groove 122, the line 132, the chamber 128, the line 136, the chamber 144 and the line 148. Similarly, any fluid leaking into the chamber 190 is returned to the chamber 50 through the opening 114, the line 118, the groove 116, the line 130, the chamber 126, the line 134, the chamber 142 and the line 146. The leakage into the chamber between land 160 and the bushing 162 follows the same path from the groove 116 after passing through the line 164.

The operation of the system will first be described when the relative motion is caused by excitation of the unsprung mass. During movements of only the unsprung mass, the block 108 does not move but remains in its neutral horizontal position as shown in Figure 1. In this position, the tube 88 is retained so that its openings 94 are in direct alignment with the orifices 84 in the bearing 76. Therefore, the fluid flow through the orifices 84 remains unrestricted and the shock absorber 20 provides a minimum amount of damping force as represented by the curve A in Figure 3. Because the damping action of the shock absorber 20 is at a minimum, the reactive forces produced by the shock absorber and thus transmitted to the sprung mass are at a minimum. This substantially eliminates any discomfort which would ordinarily be caused in a vehicle when movements of the unsprung mass are fully damped by the shock absorber.

Instead of the shock absorber 20 providing the necessary damping action, the dynamic balancers 24 and 25 damp the unsprung mass to maintain the tire 16 in contact with the road. The balancers 24 and 25 effectively damp the unsprung mass without transmitting any reactive forces to the sprung mass since the balancers are independent of the sprung mass.

During movements of only the sprung mass, the block 108 becomes excited and oscillates relative to the plate 172. Because of the inertia of the block 108, its movement lags in phase the movement of the sprung mass. When the block 108 moves relative to the plate 172, it causes a rotation of the tube 88 relative to the sleeve 76 so that the openings 94 move out of alignment with the orifices 84 in the sleeve. The resultant restriction of the orifices 84 increases the resistance to the fluid flow in the shock absorber 20 and, therefore, increases the damping action of the shock absorber.

Curve B in Figure 3 shows the forces produced by the shock absorber 20 when the orifices 94 and 84 are restricted a maximum amount; that is, when the block 108 reaches either of the stops 174 and 176 on the plate 172.

Because of the magnetic flux in the air gap between the legs 168 and 170 of the block 108, eddy currents are set up in the plate 172 upon movements of the block relative to the plate. The interaction between the flux in the air gap and the magnetic field set up by the eddy currents causes an eddy current or magnetic damping of the movement of the block 108 so that it does not continue to oscillate after the sprung mass has returned to its rest position.

Actually, the block 108 acts as a sensor or sensing element to detect movements of the sprung mass and by changing the position of the tube 88 in accordance with such movements controls the damping action of the shock absorber 20. In this way the shock absorber 20 effectively damps motions of the sprung mass. Since the sprung mass moves at a relatively low frequency, such as 1 cycle per second, the reactive forces produced by the shock absorber are transmitted to the sprung mass at this frequency which does not appreciably affect the comfort of persons in the vehicle.

During travel over bad roads, both the sprung and unsprung masses may be violently excited and the resultant displacement of the block 108 causes an increase in the damping action of the shock absorber 20. When this occurs the sprung mass is damped by the shock absorber 20 as previously described and the unsprung mass is damped by both the shock absorber and the dynamic balancers. Thus, the unsprung mass is better damped than in present systems and the tires are maintained in contact with the road affording the driver better control over the vehicle at a time when it is important to have such control. Also, the greater damping of the unsprung mass substantially eliminates the possibility of the sprung mass striking or "bottoming" against the unsprung mass as sometimes occurs in present suspension systems, thus producing tremendous reactive forces and considerable discomfort.

The suspension system disclosed above has definite advantages over suspension systems presently in use. It provides (1) increased comfort by minimizing the transmission of reactive forces and by preventing "bottoming" of the system, (2) effective damping of both the sprung and unsprung masses, and (3) enhanced driver control over the vehicle when it is important to have such control.

Although this invention has been illustrated as applied to a hydraulic fluid system, the principles involved apply equally to air suspension systems. Furthermore, it will be understood by persons skilled in the art that the suspension disclosed can readily be adapted for use on rear wheels of automotive vehicles and the coil spring 18 may be replaced with any suitable resilient member, such as a torsion bar as is used in some vehicles. The invention is, therefore, to be limited only as indicated by the scope of the appended claims.

What is claimed is:

1. In a suspension system for a vehicle having a sprung mass and an unsprung mass, the combination therewith of damping means operatively connected between the sprung and unsprung masses including means controlled only by sprung mass movements for effectively damping sprung mass movements at all times and unsprung mass movements only when said unsprung mass movements occur simultaneously with said sprung mass movements, and damping means operatively connected only to the unsprung mass for damping only unsprung mass movements.

2. In a suspension system for a vehicle having a sprung mass and an unsprung mass, the combination therewith of first damping means operatively connected between the sprung and unsprung masses, means operatively connected to said first damping means for controlling the damping action of said first damping means to provide for effective damping of sprung mass movements at all times and unsprung mass movements only when said unsprung mass movements occur simultaneously with said sprung mass movements, and second damping means operatively connected only to the unsprung mass for damping only unsprung mass movements.

3. In a suspension system for a vehicle having a sprung mass and an unsprung mass, the combination therewith of first damping means operatively connected between the sprung and unsprung masses, means responsive only to sprung mass movements for initiating and controlling the effective damping force of said first damping means in accordance with said sprung mass movements to provide for proportionate damping of the sprung mass movements, said means initiating effective damping of unsprung mass movements by said first damping means only when said unsprung mass movements occur simultaneously with said sprung mass movements, and second damping means operatively connected only to the unsprung mass for damping only unsprung mass movements.

4. In a suspension system for a vehicle having a sprung mass and an unsprung mass, the combination therewith of a first damper operatively connected between the sprung and unsprung masses, means in said first damper responsive only to movements of the sprung mass for initiating and controlling the effective damping force produced in the first damper in proportion to the amount of sprung mass movement, said means initiating a damping force in said first damper effective against unsprung mass movements only when said unsprung mass movements occur simultaneously with said sprung mass movements, and a second damper operatively connected only to the unsprung mass for damping only unsprung mass movements.

5. In a suspension system for a vehicle having a sprung mass and an unsprung mass, the combination therewith of a fluid damping means connected between the sprung and unsprung masses, a variable orifice in the damping means for varying the damping force produced in accordance with the amount of orifice opening, means for varying the orifice opening in response to sprung mass movements to provide for controlled damping of the sprung mass movements at all times and unsprung mass movements only when said unsprung mass movements occur simultaneously with said sprung mass movements, and a dynamic balancer operatively connected to the unsprung mass to damp only unsprung mass movements.

6. In a suspension system for a vehicle having a sprung mass and an unsprung mass, the combination therewith of a damper connected between the sprung and unsprung masses for normally providing a relatively small amount of damping force to minimize the transmission of reactive forces to the sprung mass upon movements of only the unsprung mass, a sensor for detecting movements of the sprung mass and for increasing the damping force in the shock absorber in accordance with the amount of sprung mass movement to effectively damp sprung mass movements at all times and unsprung mass movements only when occurring simultaneously with said sprung mass movements, and a dynamic balancer operatively connected to the unsprung mass to damp only unsprung mass movements.

7. In a suspension system for a vehicle having a sprung mass and an unsprung mass, the combination therewith of a damper connected between the sprung and unsprung masses, adjustable means in the damper for varying the damping action of the damper in accordance with the position of the adjustable means, a sensor operatively connected to the sprung mass for detecting movements of the sprung mass and operatively connected to the adjustable means in the damper for controlling the position of the adjustable means in accordance with the detected movements of the sprung mass, the sensor positioning the adjustable means to provide a minimum damping action by the damper at substantially zero sprung mass movement to minimize the transmission of reactive forces to the sprung mass upon movements of the unsprung mass and to provide increased damping action by the damper in accordance with the amount of sprung mass movement to effectively damp sprung mass movements at all times and unsprung mass movements only when occurring simultaneously with said sprung mass movements, and a dynamic balancer operatively connected to the unsprung mass to continuously damp only unsprung mass movements.

8. In a suspension system for a vehicle having a sprung mass and an unsprung mass, the combination therewith of inertia controlled damping means operatively connected between the sprung and unsprung masses for effectively damping sprung mass movements at all times and unsprung mass movements only when said unsprung mass movements occur simultaneously with said sprung mass movements, and damping means operatively connected only to the unsprung mass for damping only unsprung mass movements.

References Cited in the file of this patent

UNITED STATES PATENTS

| | | |
|---|---|---|
| 1,928,228 | Olley | Sept. 26, 1933 |
| 2,015,453 | Kindl et al. | Sept. 25, 1935 |
| 2,165,332 | Best | July 11, 1939 |
| 2,375,377 | Mitereff | May 8, 1945 |
| 2,746,768 | Bowser | May 22, 1956 |

FOREIGN PATENTS

| | | |
|---|---|---|
| 539,720 | Great Britain | Sept. 22, 1941 |